(12) United States Patent
Hsieh et al.

(10) Patent No.: US 6,507,667 B1
(45) Date of Patent: Jan. 14, 2003

(54) COLOR DIGITAL IMAGING APPARATUS HAVING A RULE-BASED HUE-SHIFT PROCESSOR

(75) Inventors: Louis Hsieh, Taipei (TW); Alice Yang, Hsinchu (TW); Alex Chen, Taipei (TW)

(73) Assignee: Umax Data Systems, Inc. (TW)

( * ) Notice: Subject to any disclaimer, the term of this patent is extended or adjusted under 35 U.S.C. 154(b) by 0 days.

(21) Appl. No.: 09/473,984

(22) Filed: Dec. 29, 1999

(51) Int. Cl.$^7$ ................................................ G06K 9/00
(52) U.S. Cl. .................... 382/167; 382/274; 348/223.1; 348/649; 358/518; 358/520
(58) Field of Search ................................ 382/162, 167, 382/274–275, 155–160; 358/513–524, 447, 443, 1.9, 509; 348/649, 223.1, 224.1, 231.99, 231.6, 370, 371, 242, 703–704; 345/589–591, 597, 604

(56) References Cited

U.S. PATENT DOCUMENTS

| | | | | |
|---|---|---|---|---|
| 4,847,680 A | * | 7/1989 | Okino | 348/224.1 |
| 5,001,552 A | * | 3/1991 | Okino | 348/224.1 |
| 5,812,286 A | * | 9/1998 | Lin | 358/519 |
| 6,140,997 A | * | 10/2000 | Tanaka | 345/604 |
| 6,226,034 B1 | * | 5/2001 | Katayama | 348/242 |
| 6,256,067 B1 | * | 7/2001 | Yamada | 348/370 |

* cited by examiner

Primary Examiner—Phouc Tran
Assistant Examiner—Ishrat Sherali

(57) ABSTRACT

In a color digital imaging apparatus, a light source selector is provided for a user to select a proper illumination condition. When down loading the captured image in a computer system, a color correction function is performed at the computer system. The color correction function is mainly performed by the following elements: hue-shift analyzer for performing hue analysis on the original color digital image signals and generating hue-shift parameters; Rule-Based hue-shift processor for generating color correction parameters by triggering a set of predetermined rules in response to the illumination selecting signal and the hue-shift parameters; color correction module for performing color correction on the original digital color image signals and generating corrected digital color image signals according to a color conversion function based on the color correction parameters; a memory for storing the hue-shift parameters and the corrected digital color image signals; and a display interface for transferring the corrected digital color image signals from the second memory means to a display device and displaying a dialog box for illumination condition selections.

13 Claims, 3 Drawing Sheets

COLOR DIGITAL IMAGING APPARATUS HAVING A RULE-BASED HUE-SHIFT PROCESSOR

BACKGROUND OF THE INVENTION

A. Field of the Invention

The present invention relates to a color digital imaging apparatus, especially to a color digital imaging apparatus having a rule-based hue-shift processor for after-shot recovery.

B. Description of the Prior Art

As color digital imaging apparatus, such as digital cameras and color video cameras, are getting more popular in the market, the demand for better color performance of the output images is also increasing. Since a slight color difference between an output image and an actual scene is noticeable, therefore the effects of the color reproduction in the output image will determine the quality of the color digital imaging devices.

For color reproduction, it is desirable to select all optimum set of spectral characteristics for the color sensors, such as CCD (Charge Coupled Device). The goal of good color reproduction is to choose a set of spectral characteristics for the color digital imaging device which is as close as possible to the spectral characteristics of the intended display device. The digital signals produced by the color sensor will be a function of the spectral characteristics of the light used to illuminate the scene. For example, if the color processing in a camera is designed to give good color reproduction in a daylight light source, unacceptable color reproduction may be obtained if the camera is used with, flash, or fluorescent illumination. This is due to the fact that the response measured by the color sensors is a function of the spectral power distribution of the light source as well as the spectral reflection of the objects in the scene, and the spectral responses of the sensors.

To improve the color performance of a color digital imaging device, a conventional technology uses a color-correction matrix in the pre-processing section of the color digital imaging device. The matrix coefficient is obtained from a color matching function. Usually the color matching function is obtained via complicated numerical analysis of the images. Some conventional technology applies a color temperature detecting circuit in the pre-processing section for modifying the matrix coefficients for a primary color separator used to perform a color-correction operation for a color digital imaging device. Eventually, selecting the color-correction matrix coefficients can account for changes in illuminant color temperature and provide an output image with better color performance.

Conventional color digital imaging devices also require a post-processing module for processing the downloaded images. Usually, the post-processing module are designed following the ICC (International Color Consortium) Profile Format Specification for defining the output format of colors and also recording the conversion profiles of the spectral characteristics of a particular light source. Accordingly, the RGB input profiles are established which will correct the spectral sensitivities of an input device for a connection space. Thereupon, the output profiles are used to convert the signals from the connection space to a format that is expected by an output device. The implementation for the conventional technology is very complicated. The manufacture cost is also very high.

SUMMARY OF THE INVENTION

Accordingly, it is an object of the present invention to provide a color digital imaging apparatus having a rule-based hue-shift processor which can provide a color correction parameter for a color transfer function according to the hue-shift analysis on an original color digital image, thereby to generate good color reproduction of images without the requirement of complicated numerical analysis.

It is another object of the present invention to provide an intelligent color digital imaging apparatus capable of after-shot recovery. The user can manually select a correspondent light source at the time of taking pictures, or even in viewing the images displayed on the display device. The after-shot recovery function is performed by a rule-based hue-shift processor for generating a color correction parameter to adjust the hue of the captured image according to a correct light source selected at a computer system. Consequently, the quality of the output image can be further guaranteed even after shot.

In accordance with the present invention, the color digital imaging apparatus is embodied with a light source selector for generating an illumination selecting signal selected by the user. The after-shot recovery function is implemented in a computer system. When downloading the captured image in a computer system, a color correction function is performed at the computer system. The color correction function is mainly performed by the following elements: hue-shift analyzer for performing hue analysis on the original color digital image signals and generating hue-shift parameters; a Rule-Based hue-shift processor for generating color correction parameters by triggering a set of predetermined rules in response to the illumination selecting signal and the hue-shift parameters; a color correction module for performing color correction on the original digital color image signals and generating corrected digital color image signals according to a color conversion function based on the color correction parameters; a memory for storing the hue-shift parameters and the corrected digital color image signals; and a display interface for transferring the corrected digital color image signals from the second memory means to a display device and displaying a dialog box for illumination condition selections.

BRIEF DESCRIPTION OF THE DRAWINGS

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

A preferred embodiment of the invention is described below. This embodiment is merely exemplary. Those skilled in the art will appreciate that changes can be made to the disclosed embodiment without departing from the spirit and scope of the invention.

Figure 1:
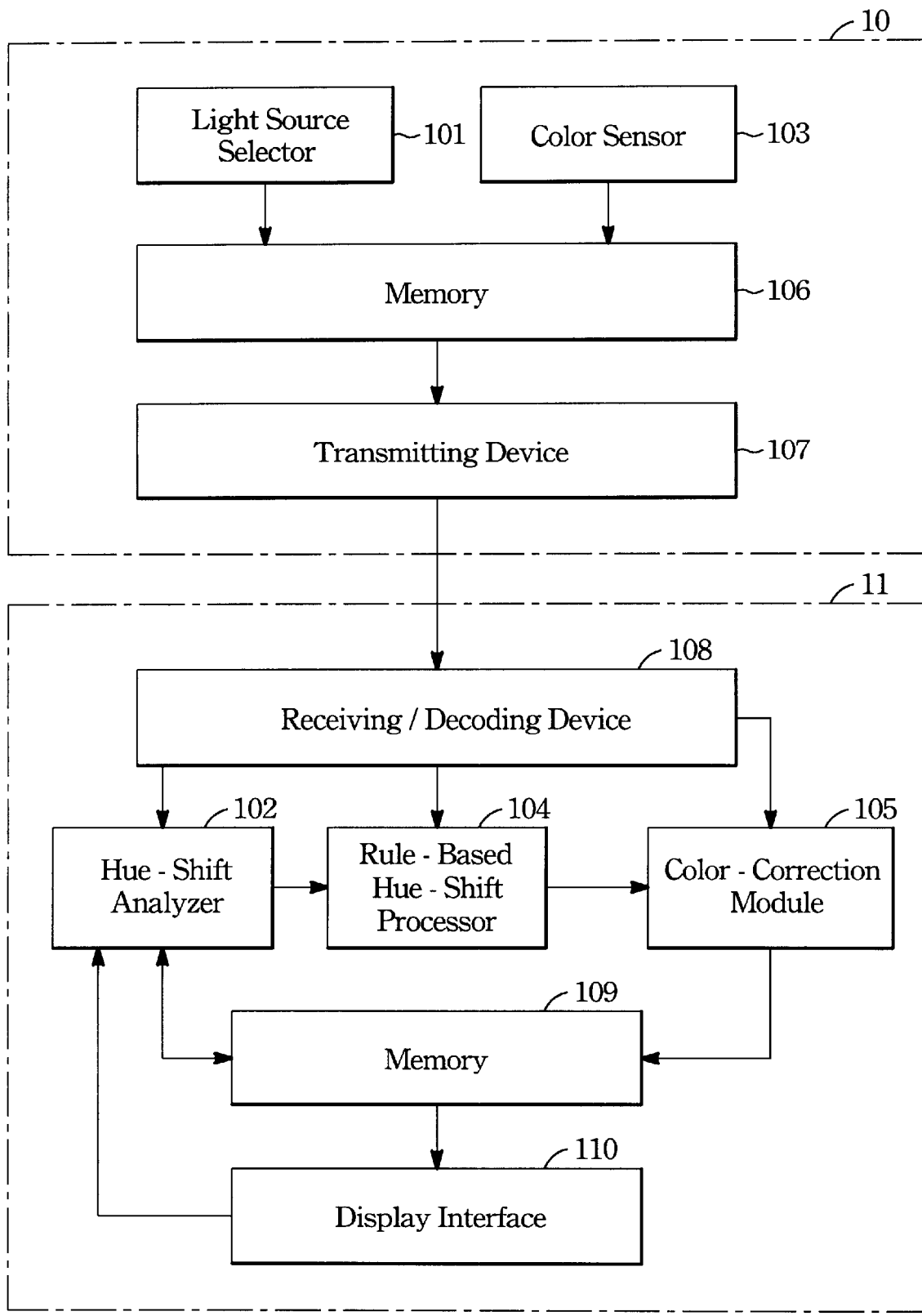
FIG. 1 is a functional block diagram showing the preferred embodiment of the present invention.

The color digital imaging apparatus of the present invention can refer to a digital camera, a color video camera or a scanner. The present invention can be illustrated more clearly with reference to FIG. 1. On the housing of the color digital imaging apparatus 10, there is a light source selector 101 which provides various light sources for the user to select according to the illumination condition at the time of shooting, such as, sunny, cloudy, fluorescent lamp, and tungsten lamp. In response to a selected light source, the light source selector 101 generates an illumination selecting signal which is stored in a memory 106. Meanwhile, the color sensor 103, such as a CCD image sensor or a CMOS sensor, captures the image of the scene and generates original color image signals which are also stored in the memory 106.

When the user wants to download the captured images, he may connect the color digital imaging apparatus 10 to a computer system 11 or a display device (not shown). Then, the transmitting device 107 encodes the illumination selecting signal and the original color image signals in a format defined by a communication protocol of a connecting port, such as an USB, a serial port, or a parallel port. Then, the encoded image data will be transferred to the computer system 11, or directly to a display device (not shown).

The color correction function provided by the present invention is performed at the computer system. In the computer system 11, a receiving/decoding device 108 is provided for receiving and decoding the encoded original color image signals and the illumination selecting signal downloaded from the transmitting device 107. After decoding the original color image signals and the illumination selecting signal, the hue-shift analyzer 102 analyzes the hue of the original color image signals.

The hue-shift analyzer 102 determines if the hue of the original color image signals shifts towards red, green or blue color based on the distribution of a color component on a histogram. Currently, there are many color models available for analyzing the hues of an image. For instance, the color monitor is based on LAB color model, color television based on YIQ color model, color printing based on CMY color model, etc. For the present invention, an HSI color model is adopted for analyzing hues. However, other color models can also be adopted too.

Figure 3:
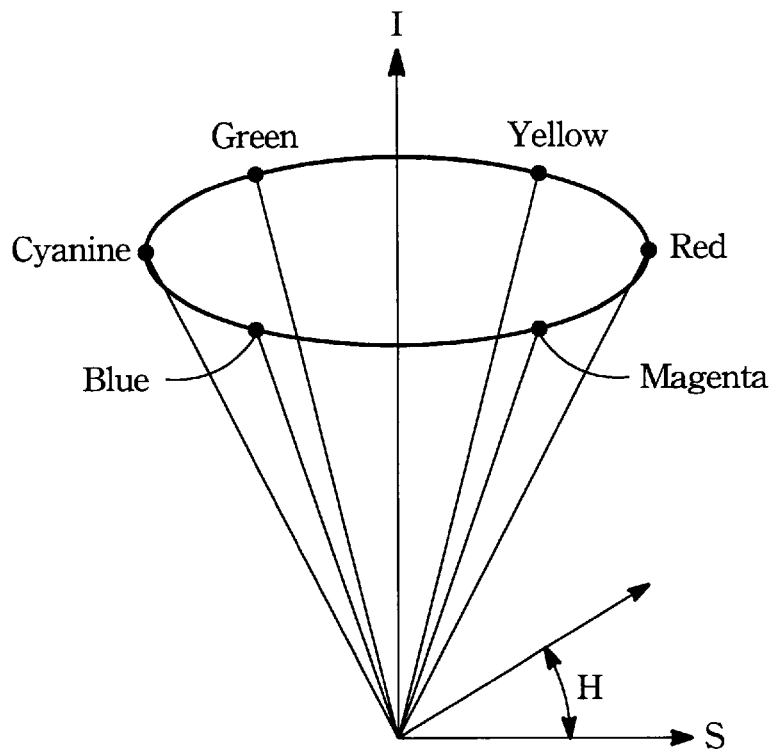
FIG. 3 is a schematic diagram showing the HSI color model.

HSI (Hue, Saturation, Intensity) color model is based on three color attributes, including Hue for describing a pure color, Saturation for giving a measure of the degree to which a pure color is diluted by white light, and Intensity for the measurement ranging from dark to white. The relationship among these three attributes can be illustrated from the chromaticity diagram as illustrated in FIG. 3. Refer to FIG. 3, H refers to the angle of the vector shown with respect to the vertical red axis. The angle of each of the six colors, i.e. Red, Yellow, Green, Cyanine, Blue and Magenta is 60 degrees. Saturation, S, is proportional to the ½ radius distance away from the vertical axis. I is proportional to the distance away from the tip of the cone. Thus, the conic surface represents pure colors, its color is getting lighter when getting closer to the vertical axis. The vertical axis represents various hues. The luminosity increases as it getting farther from the tip of the cone.

In the present invention, the hue shift analysis on the digital image signal begins from analyzing its luminosity channel (or gray level values) based on the distribution diagram of the histogram. The mean value computed from the histogram is set as "0" which functions as a standard value for comparison. Then, perform the same analysis for each red, green, blue channel of the image based on the distribution diagram of the histogram and compute the mean value of each channel. Then, compute the difference between the mean value of the luminosity channel with the mean values of each red, green, blue channel. The difference indicates the degree of hue-shift. The difference with the largest value will be chosen as the hue-shift parameter. For instance, if the difference between the mean value of red color and the mean value of the luminosity channel is the largest. It indicates that the hue of the image is tending to red. Thus, the red components of the image shall be reduced to a predetermined value according to a selected illumination condition. Then, the hue-shift parameter shall be forwarded to the Rule-Based hue-shift processor 104.

Rule-Based hue-shift processor 104 is a Rule-Based system which is established according to an expert system. The Rule-Based hue-shift processor 104 can trigger a set of rules according to the hue-shift parameter input from hue-shift analyzer 102 and the illumination selecting signal input from the receiving/decoding device 108. Then, the set of rules can perform an inference procedure to generate a color correction parameter proper for a color transfer function. For instance, given several illumination conditions, including sunny, cloudy, fluorescent lamp, and tungsten lamp. Since the tungsten lamp contains more red components, and other illumination conditions contain relatively more blue components, therefore the magnitude of the blue components under these illumination conditions can be arranged in the order of fluorescent lamp>cloudy>sunny. Accordingly, the Rule-Base inference procedure can be simplified according to the selected illumination condition. For instance:

Case 1: "sunny" is selected as an illumination condition: If the captured image contains more green components, then it indicates that the image was captured under fluorescent lamp. In another case, if the captured image contains more red components, then it indicates that the image was captured under tungsten lamp. On the other hand, if the green component or the red component in the captured image is normal, it indicates the color temperature is normal and thus it does not require the color correction procedure.

Case 2: "Cloudy" is selected as an illumination condition: If the captured image contains more green components, then it indicates that the image was captured under fluorescent lamp. And if the captured image contains more red components, then it indicates that the image was captured under tungsten lamp. On the other hand, if the green components or the red components in the captured image are within a normal range, then it indicates that the color temperature of the image is normal and thus it does not require a color correction procedure.

Case 3: "fluorescent lamp" is selected as an illumination condition: If the captured image contains more red components, then it indicates that the image was not captured under fluorescent lamp. On the other hand, if the red components in captured image are normal, it indicates the color temperature is normal and thus the image does not require the color correction procedure.

Case 4: "tungsten lamp" is selected as an illumination condition: If the captured image contains more blue components, then it indicates that the image was not captured under tungsten lamp. On the other hand, if the blue components contained in the captured image are within a normal range, it indicates that the color temperature of the image is normal and thus it does not require the color correction procedure.

Accordingly, the Rule-Based Hue-Shift processor 104 may contain a set of predetermined rules for generating proper color correction parameters, such as a R_key, G_key, and B_key, for adjusting the hues of the RGB channels.

Figure 4:
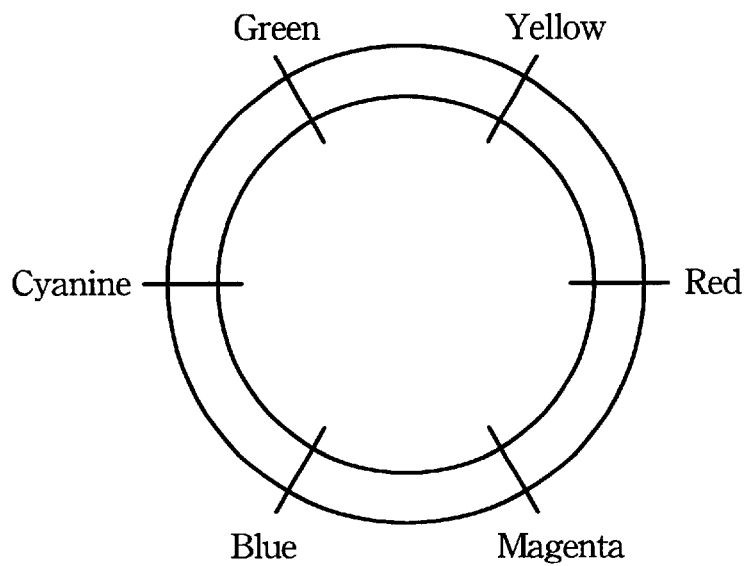
FIG. 4 is a color plate showing the arrangement of the chromatic colors when converted from the HSI color model.

The color correction parameters of the Rule-Based hue-shift processor 104, such as R_key, G_key, and B_key, are sent to the color correction module 105. Refer to FIG. 4 for illustrating the process for converting from HSI color model into RGB color values. The color plate as illustrated in FIG. 4 contains 7 colors. When the captured image is converted from HSI color model to RGB color values, the Hue of the image can be represented as a color plate as illustrated in FIG. 4. In that case, R_key refers to the link connecting the red color and Cyanine color. G_key refers to the link connecting green color and magenta color. B_key refers to the link connecting blue color and yellow color. In HSI color model, R_key, G_key and B_key represents the values for adjusting color saturation. The colors at the opposite ends of each link represent the compensation hues. Thus, the key value for a hue represents the value for adjusting the saturation of that hue. When obtaining the values for the R_key, G_key, B_key, first convert these values from the Cartesian coordinates to the circular coordinates because the circular coordinates is correspondent to the HSI color model.

Accordingly, the digital image signals are converted from the HSI color model to RGB colors. Then, the color correction module 105 can compute the color correction parameters by computing the difference between the Hues and Saturation values of the original Red, Green Blue components and the Hues and Saturation values of the R_key, G_key, and B_key. There are various color correction functions available for adjusting the hue of each pixel of the image. The present invention only shows one method for introducing the color correction parameter into a color correction function. If the image contains more blue components, then the blue color value is adjusted to a predetermined value. For the convenience of operation, each time only one color is adjusted.

Then, the corrected digital image data, and the greatest hue-shift parameter along with its color are stored in a memory 109. When displaying the image on the screen or the display device, the display interface 110 reads the digital image data stored in the memory 109. The display interface 110 also shows a dialog box for selecting an illumination condition. The dialog box contains various illumination conditions corresponding to the illumination conditions provided by the light source selector 101. If the user founds that the color temperature of the displayed image was not right because a wrong illumination condition was accidentally selected. Then, the user can reset the illumination condition from the dialog box of the display interface 110 to reproduce the color in response to the newly selected illumination condition.

After the user selects a new illumination condition, the display device 110 sends the illumination correction signal to the hue-shift analyzer 102. Then, the hue-shift analyzer 102 reads the corrected digital image signals from the memory 109 and then performs the hue shift analysis on the corrected digital image signals. Then, in response to the new illumination correction signals, the hue-shift analyzer 102, the Rule-Based hue-shift processor 104 and the color correction module 105 perform the same procedures as described above for adjusting the digital image signals stored in the memory 109. Since the color correction procedure involves very little computation, so it can be done very quickly and allow the user to view the corrected image on the display device almost instantly. The loop continues until the user is satisfied with the color reproduction of the image on the display device.

Figure 2:
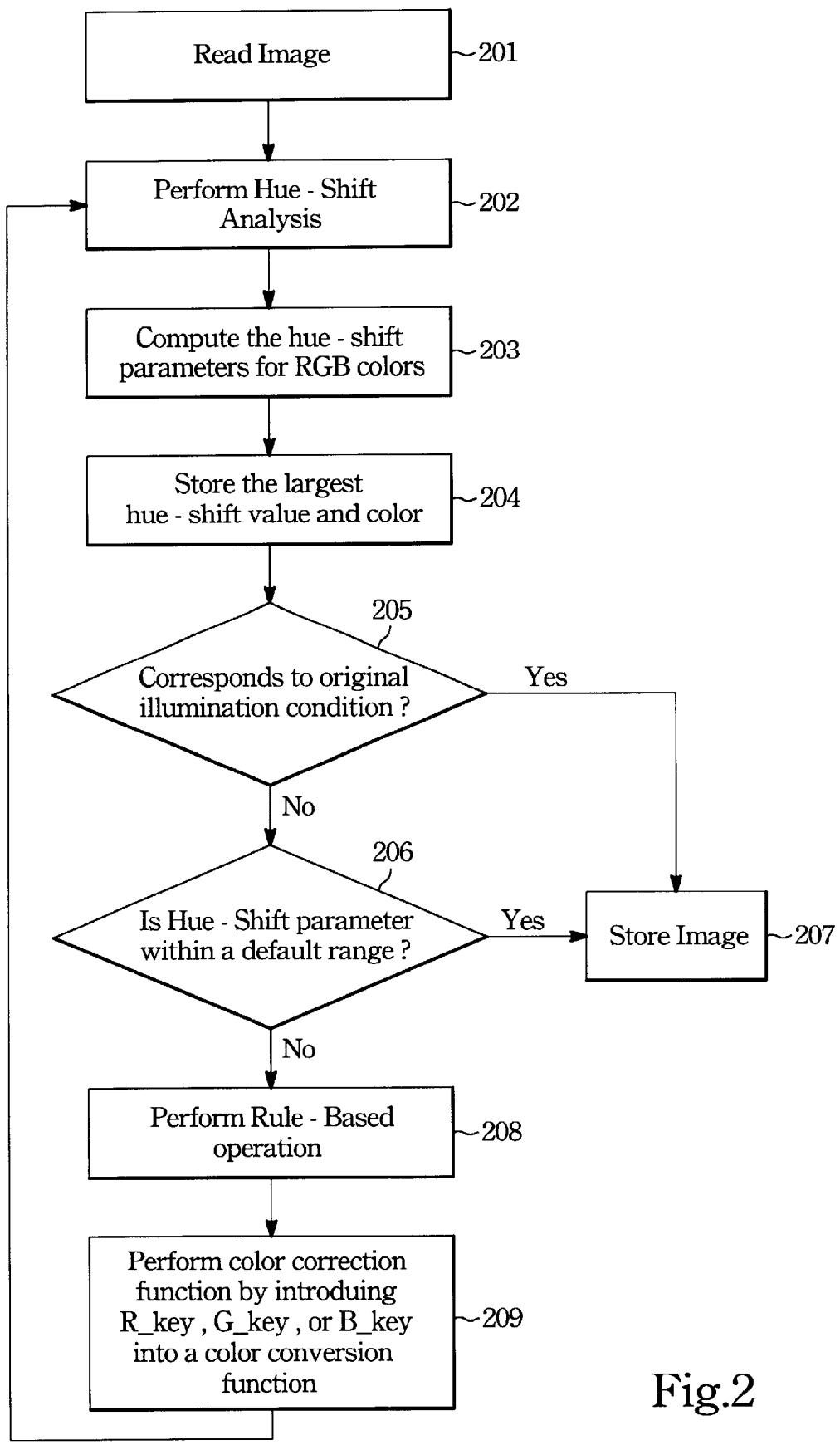
FIG. 2 is a flowchart showing the color correction procedure according of the preferred embodiment of the present invention.

Accordingly, the color correction procedure can be illustrated in FIG. 2. When the user starts to download the digital image data to the computer system, the computer system performs the following steps:

Step 201: download the color digital image signals and the illumination selecting signal. The illumination selecting signals indicate illumination conditions such as, sunny, cloudy, fluorescent lamp, and tungsten lamp.

Step 202: perform the hue-shift analysis on the color digital image signals. According to the HSI color model, the hue shift analysis on the digital image signal begins from analyzing its luminosity channel (or gray levels) based on the distribution diagram of the histogram. The mean value computed from the histogram is set as "0" which functions as a standard value for comparison. Then, perform the same analysis for each red, green, blue channel of the image based on the distribution diagram of the histogram and compute the mean value of each channel. Then, compute the difference between the mean value of the luminosity channel with the mean value of each red, green, blue channel. The difference indicates the degree of hue-shift. The difference with the largest value will be chosen as the hue-shift parameter.

Step 203: Compute the hue-shift parameters for the red, green and blue channels. Let Ym represent the mean value for the gray level. Rm represents the mean value for the red channel. Gm represents the mean value for the green channel. Bm represents the mean value for the blue channel. Then, compute the hue-shift parameters for the red, green, and blue colors as follows:

$\Delta R = Ym - Rm$ $\Delta G = Ym - Gm$ $\Delta B = Ym - Bm$

Step 204: Find the greatest hue-shift values from the absolute values among $\Delta R$, $\Delta G$, and $\Delta B$. The greatest hue-shift value will be taken as the hue-shift parameter and then stored along with its color channel.

Step 205: Determine if the hue-shift condition of the image corresponds to the original illumination condition? If yes, skip the image correction procedure and go to step 207. If not, go to step 206.

Step 206: Determine if the hue-shift parameters of the red, green, and blue colors are within a default value? If yes, go to step 207. If not, go to step 208.

Step 207: Store the image to be displayed on the display device.

Step 208: Perform Rule-Based operations for outputting a proper color correction parameter, represented as R_key, G_key, or B_key.

For instance, suppose that RGB channels are ranging from 0 to 255. The mean value of each R, G, or B channel is also ranging from 0 to 255. Thus, the difference between two mean values must be smaller than 255. If the absolute values of $\Delta R$ is the greatest among the rest, then the R_key can be converted to a value according to table 1:

TABLE 1

| ΔR | −255~−129 | −128~−65 | −64~−33 | −32~−17 | −16~−1 | 0 | 1~16 | 17~32 | 33~64 | 65~128 | 129~255 |
|---|---|---|---|---|---|---|---|---|---|---|---|
| R_key | 100 | 50 | 25 | 10 | 1 | 0 | −1 | −10 | −25 | −50 | −100 |

If the absolute values of ΔG is the greatest among the rest, then the G_key can be converted to a value according to table 2:

TABLE 2

| ΔG | −255~−129 | −128~−65 | −64~−33 | −32~−17 | −16~−1 | 0 | 1~16 | 17~32 | 33~64 | 65~128 | 129~255 |
|---|---|---|---|---|---|---|---|---|---|---|---|
| G_key | 100 | 50 | 25 | 10 | 1 | 0 | −1 | −10 | −25 | −50 | −100 |

If the absolute values of ΔB is the greatest among the rest, then the B_key can be converted to a value according to table 3:

TABLE 3

| ΔB | −255~−129 | −128~−65 | −64~−33 | −32~−17 | −16~−1 | 0 | 1~16 | 17~32 | 33~64 | 65~128 | 129~255 |
|---|---|---|---|---|---|---|---|---|---|---|---|
| B_key | 100 | 50 | 25 | 10 | 1 | 0 | −1 | −10 | −25 | −50 | −100 |

According to the values in the tables 1~3, and the hue-shift correction rules, the rules in the Rule-Based system can be established by the exemplary rules as follows:

If −129>ΔR>−255, then R_Key=100;
If −65>ΔR>−128, then R_Key=50;
If −33>ΔR>−64, then R_Key=25;
If −17>ΔR>−32, then R_Key=10;
If −1>ΔR>−16, then R_Key=1;
If ΔR=0, then R_Key=0;
If 1<ΔR<16, then R_Key=−1;
If 17<ΔR<32, then R_Key=−10;
If 33<ΔR<64, then R_Key=−25;
If 65<ΔR<128, then R_Key=−50;
If 129<ΔR<255, then R_Key=−100;
If −129>ΔG>−255, then G_Key=100;
If −65>ΔG>−128, then G_Key=50;
If −33>ΔG>−64, then G_Key=25;
If −17>ΔG>−32, then G_Key=10;
If −1>ΔG>−16, then G_Key=1;
If ΔG=0, then G_Key=0;
If 1<ΔG<16, then G_Key=−1;
If 17<ΔG<32, then G_Key=−10;
If 33<ΔG<64, then G_Key=−25;
If 65<ΔG<128, then G_Key=−50;
If 129<ΔG<255, then G_Key=−100;
If −129>ΔB>−255, then B_Key=100;
If −65>ΔB>−128, then B_Key=50;
If −33>ΔB>−64, then B_Key=25;
If −17>ΔB>−32, then B_Key=10;
If −1>ΔB>−16, then B_Key=1;
If ΔB=0, then B_Key=0;
If 1<ΔB<16, then B_Key=−1;
If 17<ΔB<32, then B_Key=−10;
If 33<ΔB<64, then B_Key=−25;
If 65<ΔB<128, then B_Key=−50;
If 129<ΔB<255, then B_Key=−100;

Step 209: Perform color correction function according to the R_key, G_key or B_key found in step 208. The color correction parameters can be introduced into the conversion function for converting from HSI color model into RGB values. For instance, the absolute value of R_key represents the saturation value of HSI model. The positive or negative values of the hues represent the increasing or decreasing of the hues. Accordingly, R_key<0 means that the hue of Cyanine should be increased, and the hue of red color should be increased if otherwise. In contrast, if G_key<0, it indicates that the hue of Magenta should be increased. On the other hand, if G_key>0, the hue of green color should be increased. If B_key<0, it indicates that the hue of yellow color should be increased. In contrast, if B_key>0, the hue of blue colors should be increased.

In addition to the color correction, some other well-known image processing technology, such as interpolation, edge-enhancement, and Gamma correction can also be applied at this step. Then, go to step 202.

Thus, the color temperature of the image can be almost instantly displayed on the screen according to the selected illumination condition. The user can adjust the color reproduction of the image by simply clicking a illumination condition selected from the dialog box of the display interface.

To sum up, the color digital imaging apparatus of the present invention provides a light source selector for an easy operation, thereby to generate color images with high color fidelity without a color temperature detector. Moreover, the color correction procedures described above do not require complicated image analysis and experiment. In addition, since most color digital imaging devices provides many kinds of light sources, so they must follow complicated ICC profile formats for color corrections. On the contrary, since the present invention can directly perform color corrections based on the Rule-Based hue-shift processor in response to a newly selected illumination condition, so the approach of the present invention is much easier to implement. Eventually, since the present invention can improve the effects of the color reproduction on the output image in a manner that does not require complicated computation and large memory space, so the manufacturing cost can be reduced. Furthermore, the Rule-Based hue-shift processor can also be implemented in fuzzy logic rules in a manner well-known to the art.

While this invention has been described with reference to an illustrative embodiment, this description is not intended to be construed in a limiting sense. Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. A color digital imaging apparatus comprising:

light source selecting means for providing a plurality of predetermined illumination conditions and generating an illumination selecting signal in response to each of said plurality of predetermined illumination conditions;

a color sensor for capturing the image of a scene or an object and generating original color digital image signals;

first memory means for storing said illumination selecting signal and said original color digital image signals;

hue-shift analyzing means for performing hue analysis on said original color digital image signals and generating hue-shift parameters;

Rule-Based hue-shift processing means for generating color correction parameters by triggering a set of predetermined rules in response to said illumination selecting signal and said hue-shift parameters;

color correction means for performing color correction on said original digital color image signals and generating corrected digital color image signals according to a color conversion function based on said color correction parameters;

second memory means for storing said hue-shift parameters and said corrected digital color image signals; and a display interface for transferring said corrected digital color image signals from said second memory means to a display device and displaying a dialog box for illumination condition selections.

2. The color digital imaging apparatus as claimed in claim 1, wherein said predetermined illumination conditions comprises:

sunny, cloudy, fluorescent lamp, and tungsten lamp.

3. The color digital imaging apparatus as claimed in claim 1, further comprising:

transmitting means for transmitting and compressing said original digital color image data and said illumination selecting signal to a computer system; and means for receiving and decoding said original color digital image signals and said illumination selecting signal from said transmitting means.

4. The color digital imaging apparatus as claimed in claim 1, wherein said hue-shift analyzing means performs hue-shift analysis based on HSI color model.

5. The color digital imaging apparatus as claimed in claim 1, wherein said Rule-Based hue-shift processing means comprises a plurality of sets of predetermined rules under various hue-shift conditions to generate color correction parameters for red, green and blue color channels.

6. The color digital imaging apparatus as claimed in claim 1, wherein said color conversion function is based on HSI color model.

7. A Rule-Based hue-shift processing method for a color digital imaging apparatus comprising the steps of:

(a) selecting an illumination condition from a plurality of predetermined light sources, and generating an illumination selecting signal;

(b) capturing the image of a scene or an object and generating original color digital image signals;

(c) performing hue-shift analysis on said original color digital image signals;

(d) computing the hue-shift parameters for red, green, and blue colors of said original color digital image signals;

(e) storing the largest hue-shift parameter among said hue-shift parameters for red, green, and blue colors computed in said step (d);

(f) determining if said largest hue-shift parameter corresponds to the illumination condition indicated by said illumination selecting signal;

(g) when determining said largest hue-shift parameter does not correspond to the illumination condition indicated by said illumination selecting signal, determining if said hue-shift parameters for red, green, and blue colors are within a predetermined range;

(h) when determining said hue-shift parameters for red, green, and blue colors are within a predetermined range, storing said original color digital image signals;

(i) when determining said hue-shift parameters for red, green, and blue colors are not within a predetermined range, triggering a set of predetermined rules in response to said illumination selecting signal and said hue-shift parameters to generate color correction parameters; and (j) performing color correction on said original digital color image signals and generating corrected digital color image signals according to a color conversion function based on said color correction parameters.

8. The Rule-Based hue-shift processing method for a color digital imaging apparatus as claimed in claim 7, further comprising the steps of:

displaying said corrected digital color image signals from said second memory means, and providing a dialog box for illumination condition selections;

determining if the hue of said corrected digital color image signals is correct;

when determining the hue of said corrected digital color image signals is not correct, selecting a new illumination condition from said dialog box and generating an illumination correction signal; and repeating said step (c) to said step (j) according to said illumination correction signal.

9. The Rule-Based hue-shift processing method for a color digital imaging apparatus as claimed in claim 7, wherein said illumination conditions comprises:

sunny, cloudy, fluorescent lamp, and tungsten lamp.

10. The Rule-Based hue-shift processing method for a color digital imaging apparatus as claimed in claim 7, wherein said hue-shift analysis of said step (c) is based on HSI color model.

11. The Rule-Based hue-shift processing method for a color digital imaging apparatus as claimed in claim 7, wherein said hue-shift parameters for red, green, and blue colors of said original color digital image signals in said step (d) are computed by finding the difference between each mean value of red, green, and blue color channels with the mean value of luminosity channel based on an HSI color model.

12. The Rule-Based hue-shift processing method for a color digital imaging apparatus as claimed in claim 7, wherein said set of predetermined rules of said step (i) comprises a plurality of predetermined rules established for determining a proper color correction parameter under various hue-shift conditions for red, green, and blue colors.

13. The method as claimed in claim 7, further comprising the step of:

when determining said largest hue-shift parameter corresponds to the illumination condition indicated by said illumination selecting signal, storing said digital color image signals.

* * * * *